United States Patent
Green

(12) 
(10) Patent No.: US 6,250,260 B1
(45) Date of Patent: Jun. 26, 2001

(54) BI-FUEL CONTROL SYSTEM AND ASSEMBLY FOR RECIPROCATING DIESEL ENGINE POWERED ELECTRIC GENERATORS

(76) Inventor: Jason E. Green, 16539 Ruby Lake, Weston, FL (US) 33331

(*) Notice: Subject to any disclaimer, the term of this patent is extended or adjusted under 35 U.S.C. 154(b) by 0 days.

(21) Appl. No.: 09/170,700

(22) Filed: Oct. 13, 1998

(51) Int. Cl.$^7$ .................................................. F02B 3/00
(52) U.S. Cl. ...................... 123/27 GE; 123/525; 123/575
(58) Field of Search ............................ 123/3, 27 GE, 123/525, 526, 575, 577, 578

(56) References Cited

U.S. PATENT DOCUMENTS

| | | | | |
|---|---|---|---|---|
| 4,335,697 | * | 6/1982 | McLean | 123/527 |
| 4,489,699 | * | 12/1984 | Poehlman | 123/525 |
| 4,535,728 | * | 8/1985 | Batchelor | 123/27 GE |
| 4,603,674 | * | 8/1986 | Tanaka | 123/575 |
| 4,606,322 | * | 8/1986 | Reid et al. | 123/575 |
| 4,617,904 | * | 10/1986 | Pagdin | 123/525 |
| 4,641,625 | * | 2/1987 | Smith | 123/575 |
| 4,708,094 | * | 11/1987 | Helmich et al. | 123/27 GE |
| 5,092,305 | * | 3/1992 | King | 123/575 |
| 5,224,457 | * | 7/1993 | Arsenault et al. | 123/526 |
| 5,370,097 | * | 12/1994 | Davis | 123/526 |
| 5,379,740 | * | 1/1995 | Moore et al. | 123/478 |
| 5,546,908 | * | 8/1996 | Stokes | 123/480 |
| 5,566,653 | * | 10/1996 | Feuling | 123/179.8 |
| 5,735,253 | * | 4/1998 | Perotto et al. | 123/406.47 |
| 5,937,800 | * | 8/1999 | Brown et al. | 123/27 GE |

* cited by examiner

*Primary Examiner*—Noah P. Kamen
*Assistant Examiner*—Hai Huynh
(74) *Attorney, Agent, or Firm*—Malloy & Malloy, P.A.

(57) ABSTRACT

A system and assembly for modifying a diesel powered electric generator preferably of the reciprocating engine type to the extent that the generator is capable of running on either 100% diesel fuel or in a "bi-fuel" mode which is defined as a mixture of methane based gas and diesel fuel. The system and associated assembly is specifically designed to provide for the automatic or manual switching between the full diesel mode and the gas-diesel fuel or bi-fuel mode for continuous generator operation without interruption in generator output and at substantially equivalent or comparable efficiency levels. A gas control sub-assembly is included for controlling the amount of gas supplied to the driving engine of the generator while operating in the bi-fuel mode, a diesel control sub-assembly is included and designed for controlling the amount of diesel fuel supply to the driving engine while operating in the bi-fuel mode, and an electronic control an monitoring sub-assembly is included and designed for controlling various components of the overall system and is further structured to monitor and display certain data associated with operation and continuous current output within pre-determined, acceptable parameters.

77 Claims, 2 Drawing Sheets

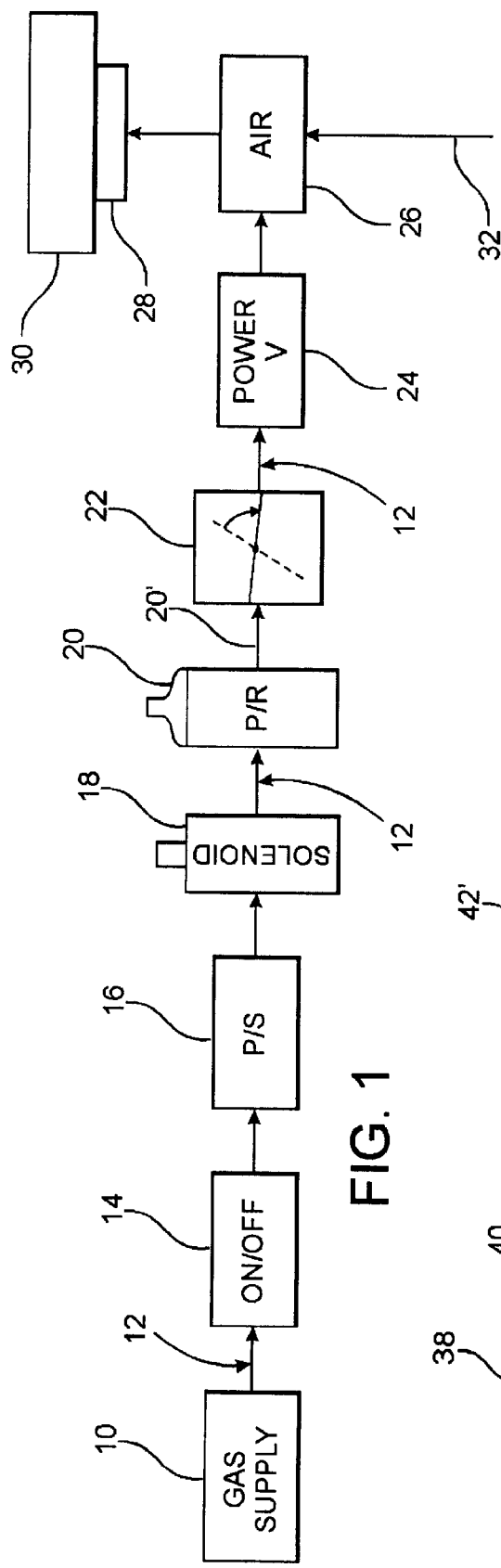
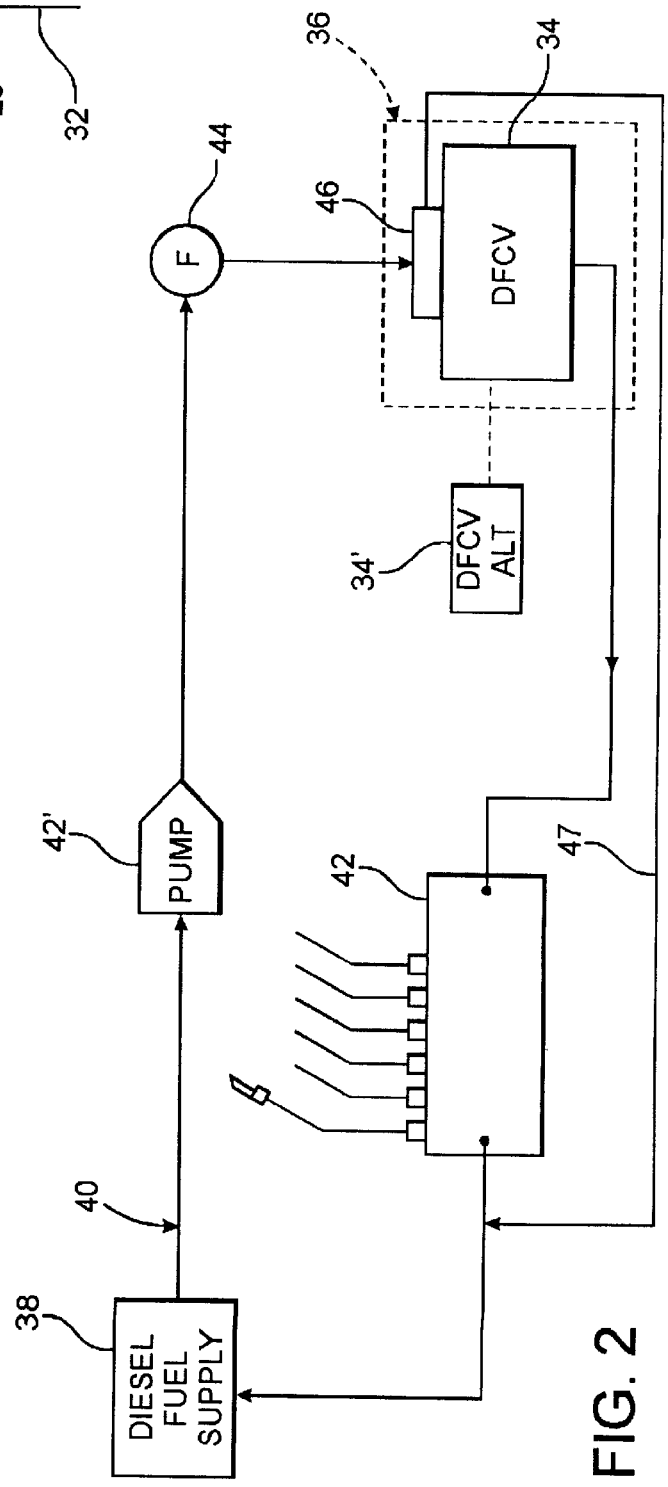
FIG. 1
FIG. 2

BI-FUEL CONTROL SYSTEM AND ASSEMBLY FOR RECIPROCATING DIESEL ENGINE POWERED ELECTRIC GENERATORS

BACKGROUND OF THE INVENTION

1. Field of the Invention

The present invention is directed to a system and an assembly, which includes operative components for implementing the system, wherein both the system and the assembly are designed to modify and/or adapt a conventional diesel powered electric generator so that it can be operated in either a full diesel fuel mode or a gas-diesel fuel mode, the latter fuel mode being defined by a mixture of a methane based gas and diesel fuel. Switching between the two fuel modes occurs either automatically or manually while the generator continues to operate continuously, without generator interruption in power output, and with operation while in bi-fuel mode resulting in efficiency levels comparable to those normally exhibited by full diesel fuel mode operation.

2. Description of the Related Art

Generators, both large and small, are commonly used articles of machinery employed to supply operating and/or electrical power for a variety of uses. These uses can range from small private uses to the powering of large facilities and/or entire operating power grids within a city. Moreover, it is the capacity of the generator which dictates the output power to be achieved thereby, and thereby dictates its potential uses.

In order to generate a power output, the generator itself must be driven by an independent power source. While many types of generators having different power sources are available, including those that operate on hydrodynamic power, solar power, etc., a primary type of generator utilizes one or more diesel fueled engines as the driving engine(s) which causes the generation of the electrical power. These diesel fuel generators are indeed preferred because of the large output capacity often exhibited thereby. However, as indicated, because the capacity of these diesel driven generators is primarily dictated by the output requirements, and because in many circumstances wherein a very large output is required, a number of diesel engine generators are often linked with one another in a parallel system so as to function together to provide a very large electrical output. Indeed, this capability is another benefit to the use of the diesel fuel powered generators.

Another significant reason diesel fuel generators are preferred over other types of generators is the relatively lesser cost of diesel fuel as compared with other fossil fuels for powering large capacity engines. Of course, however, although the cost is relatively lower, there is still a substantial expense associated with powering these diesel generators as the fuel consumption can be substantially great over an extended period of time when a large power output is desired. For this reason, it would be beneficial to provide a system which can reduce the amount of diesel fuel consumption without deteriorating the necessary power output of the generator. Furthermore, such a system should not require substantial modification and/or replacement of existing diesel powered generators, but should preferably work in conjunction with the existing models and designs so as to enhance their effectiveness and lessen the amount of diesel fuel to be consumed for a certain required output.

A further consideration that must addressed with the diesel powered generators involves the consistency of the electrical output. In particular, ideal circumstances require that a consistent output level be maintained and/or that sufficient output to correlate with demand be consistently maintained. As a result, conventional systems cannot merely decrease the diesel fuel utilized within the generator without suffering substantial negative effects as to the power output. For example, a conservation type of system wherein lesser quantities of diesel fuel are utilized at certain periods of time will generally prove ineffective and as a result is not used, as such a pattern of operation typically leads to substantial irregularities in electrical output, and furthermore, most diesel generators operate on a demand system which is truly not capable of working on a lessened diesel fuel supply without risking potentially serious damage to the generator itself. Furthermore, dedicated, spark ignited natural gas generators are typically viewed as being less efficient and expensive to operate. Accordingly, complete conversion to natural gas is also not desirable.

For the preceding reasons it would also be beneficial to provide a fuel system which can work in conjunction with existing high capacity diesel powered generator designs, but which can replace a portion of the diesel fuel utilized with an alternative, less expensive fuel. Such a system should not entirely remove the need for the diesel fuel, but would merely enhance the output achieved by lesser quantities of the diesel fuel in order to maintain consistent levels of electrical output, as would normally be capable with a full diesel fuel operation, without the normal fuel consumption. Such a system, because of the potentially volatile nature of alternative fuel sources, should also provide a seamless operation that enables a consistent output to be maintained within the usually accepted, optimal operating environment, and should be capable of detecting any potentially harmful disruptions in normal operation. Also, upon detection of any potentially hazardous conditions, the system should be capable of returning the diesel generator to normal full diesel fuel operation without downtime or without fluctuations in output power. Further, such a system should be capable of incorporation with diesel generators of varying capacities, including diesel engines which are incorporated as part of parallel systems, without effecting the normal output parameters to which those diesel generators have been implemented and are utilized under normal full diesel flow and operation.

SUMMARY OF THE INVENTION

The present invention relates to a system and associated assembly which includes operative components for implementing the system for purposes of modifying a conventional, reciprocating diesel engine powered electric generator so that the generator is capable of operation in either a full diesel fuel mode or a "bi-fuel" mode. The bi-fuel mode may be more specifically defined as a mode of operation of the generator wherein the driving engine thereof is fueled by a mixture of a methane based gas and diesel fuel, instead of 100% diesel fuel for which the conventional generator was originally designed. The term methane based gas may include a variety of gaseous fuels, such as but not limited to, natural gas, bio-gas, well head gas, etc. In a preferred embodiment to be described in greater detail, the preferred methane based gas fuel is natural gas wherein the gas-diesel fuel mixture comprises a preferred and variable mixture of fuel containing from 40% to 90% natural gas with the balance representing diesel fuel. The aforementioned percentage of natural gas utilized in the gas-diesel fuel mode of operation more definitively represents the percentage of the ingredient of natural gas as part of the total fuel being consumed when the operation of generator is in the gas-diesel fuel mode. In addition, the system and assembly of the present invention is specifically designed to be operative with all grades of diesel fuel including but not limited to diesel fuels #1, #2, #3 and heavy-bunker fuel, depending upon the normal capacity of the diesel fuel generator.

As will be set forth in greater detail hereinafter, the bi-fuel control system and associated assembly of the present invention allows a conventional generator, of the type set forth above, to be automatically returned from a gas-diesel fuel mode to a full diesel fuel mode of operation in the event of any of a plurality of pre-determined, monitored occurrences during operation of the generator and the driving engine associated therewith. Such predetermined and monitored occurrences include an indication of low gas fuel pressure of the natural gas flowing along the gas fuel path. In addition a monitored indication of a high exhaust temperature from the driving engine is particularly critical. Also, a monitored indication of low oil pressure of the driving engine as well as the generator amperage output levels being outside of the intended amperage output parameters of the generator will result in an automatic, seamless switching from the gas-diesel fuel mode to the full diesel fuel mode.

Yet another important factor in the design of the system and operation of the associated assembly of the present invention is that the generator may be returned to 100% diesel fuel operation manually by the operator through the provision of a master on/off switch located at a main control panel associated with the generator unit. Primarily significant to the design and operation of the system and the associated assembly is that either automatic or manual switching between the gas-diesel fuel mode and the full diesel fuel mode of operation results in continuous, un-interrupted generator power output.

The system and assembly of the present invention includes a gas control sub-system and sub-assembly designed for is controlling the amount of methane based gas supplied to the driving engine of the generator while operating in the gas-diesel fuel mode. More specifically, the gas control sub-system is designed to utilize a methane based gas having a preferred, predetermined gas supply pressure of between 1 psi and 5 psi. Of course, the ultimate gas pressure may be varied depending on the system requirements. Furthermore, the functional operation of the gas and diesel control sub-systems are scaleable so that they can be adapted to various size generators requiring differing air and fuel flow rates. This of course includes generators with multiple turbochargers and/or superchargers and multiple air intakes.

The preferred system and associated assembly of the present invention further includes a diesel control sub-system and associated sub-assembly which is designed for controlling the amount of diesel fuel supplied to the driving engine of the generator while it is operating in the gas-diesel fuel mode. A primary component of the diesel control sub-system and specifically the sub-assembly associated therewith, is the provision of a diesel fuel control valve which is installed in the fuel system of the generator. The diesel fuel control valve is designed to be adjusted so that when it is in an energized state, the flow of diesel fuel through the valve is significantly restricted, thereby effectively decreasing the quantity of diesel fuel supplied to the driving engine and allowing for the substitution of a homogeneous mixture of air with the natural gas when the generator operates in the gas-diesel fuel mode. For generators designed to have duty cycles that include a wide variation of load levels, the diesel fuel control valve has an alternate and more efficient structural design, to be described in greater detail hereinafter. The diesel fuel control valve is also designed, when in a de-energized state, to restore generator operation in the full diesel fuel mode upon demand by a user or upon the occurrence of several operating conditions.

The system and associated assembly of the present invention also includes an electronic control and monitoring sub-system and sub-assembly which is designed to control various components of the overall system and further to monitor certain specific operative parameters of the system and the driving engine of the generator which signify optimal and/or acceptable conditions for the gas-diesel fuel mode. The electronic control and monitoring sub-system is further designed and structured to display relevant system data and status, particularly including malfunctions, which will directly affect the transfer of operation of the generator between the gas-diesel fuel mode and the full diesel fuel mode.

Therefore, it is a primary object of the present invention to provide a bi-fuel control system designed to modify a conventional diesel powered electric generator so that it may operate in a either a full diesel fuel mode or a bi-fuel mode.

Another, primary object of the present invention is to provide a bi-fuel control system for a normally diesel powered electric generator, wherein a bi-fuel mode of operation is more specifically defined by a mixture of methane based gas and diesel fuel in pre-determined proportions.

Yet another, important object of the present invention is to provide a bi-fuel control system and an associated assembly including operative components integrated into the design of the conventional generator and the driving engine associated therewith, so as to not interfere with the normal and efficient operation and output of the generator and any operative system associated therewith.

Still another important object of the present invention is to provide a bi-fuel control system and associated assembly which is designed to activate operation of the generator in the bi-fuel or gas-diesel fuel mode, smoothly and transparently such that there is no loss in generator performance, efficiency or stability.

Yet another important object of the present invention is to provide a system and an associated assembly which provides for both an automatic and manual switching back and forth between the gas-diesel fuel mode of operation and the full diesel fuel mode of operation of the generator without interruption of the generator output.

It is also, an additional important object of the present invention to provide a system and associated assembly which when not operating has little or no effect on the originally intended, 100% diesel fuel operation of the generator and allows the generator to operate at the same levels of performance, efficiency and stability as originally designed and intended.

A further object of the present invention is to provide a system which is capable of implementation with paralleled generators without adversely affecting the operation thereof.

These and other objects, features and advantages of the present invention will become more clear when the drawings as well as the detailed description, are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a schematic representation of a gas control sub-assembly included in the bi-fuel control system and assembly of the present invention.

FIG. 2 is a schematic representation of the diesel fuel control sub-assembly included in the bi-fuel control system and assembly of the present invention.

Like reference numerals refer to like parts throughout the several views of the drawings.

DETAILED DESCRIPTION OF THE PREFERRED EMBODIMENT

Figure 3:
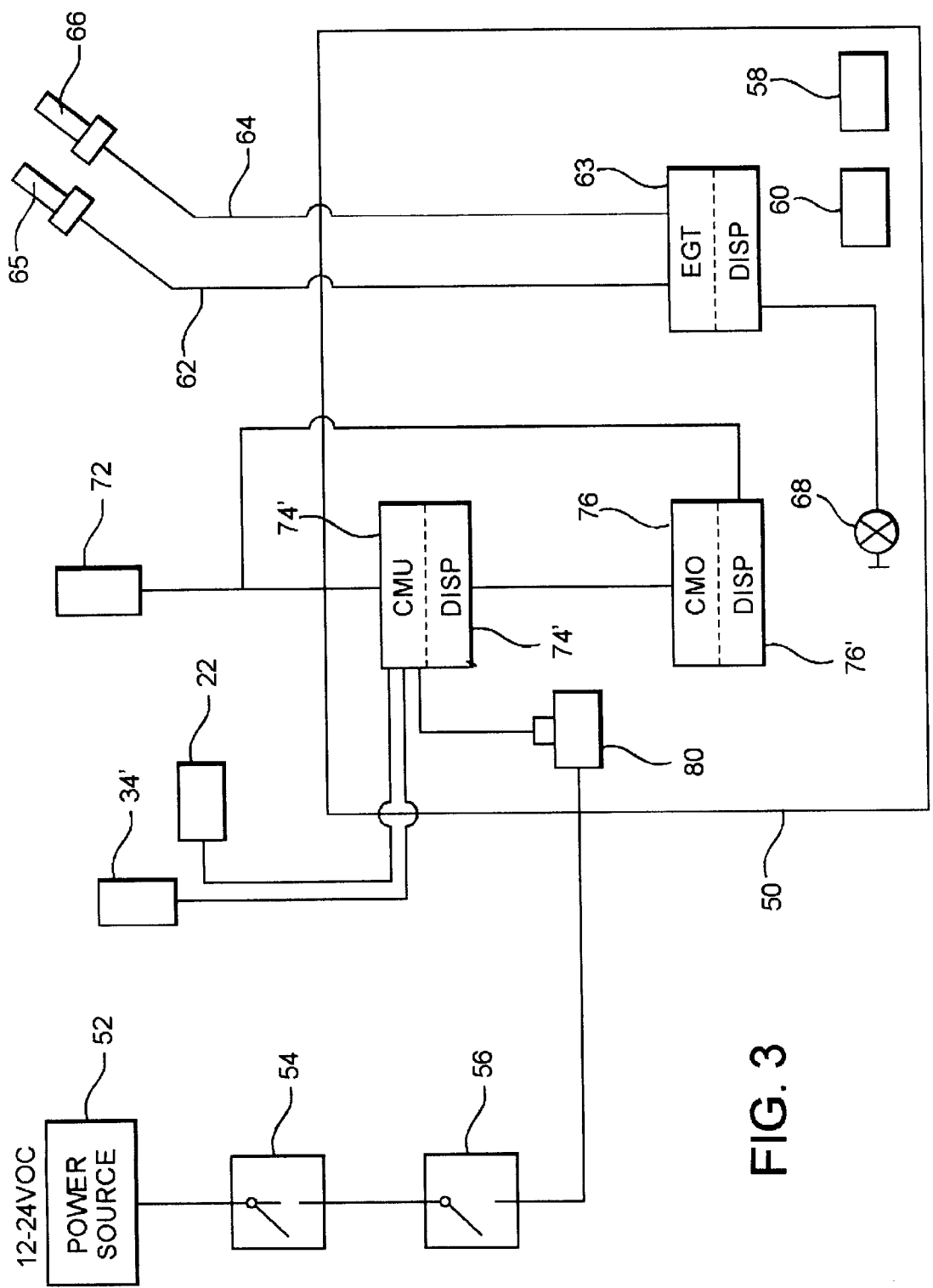
FIG. 3 is a schematic representation of an electronic monitoring an control sub-assembly of the bi-fuel control system assembly of the present invention.

The present invention is directed towards a bi-fuel control system for modifying a conventional reciprocating diesel engine powered electric generator to the extent that the generator can operate in either a full diesel mode of operation, as originally designed and intended or a bi-fuel mode of operation. The bi-fuel mode of operation may be more specifically defined as a gas-diesel fuel mixture, wherein the gas is preferably natural gas but may be any methane based gas. The gas is present in pre-determined amounts, preferably ranging from 40% to 90% of the total fuel consumed by the driving engine of the generator when the generator is operating in the gas-diesel fuel mode.

An important performance feature of the bi-fuel control system as well as the associated assembly for implementing the system of the present invention, is the ability to automatically and manually transfer between the gas-diesel fuel mode of operation and the full diesel fuel mode of operation, without any interruption or disruption in the power output of the generator. In addition, the system and associated assembly assures generator operation in either the gas-diesel fuel mode or the full diesel fuel mode at substantially equivalent or comparable efficiency levels, however, the diesel fuel consumption is significantly reduced in the gas-diesel fuel mode.

In accordance with the accompanying Figures the bi-fuel control system of the present invention will be explained, at least in part, with specific reference to an associated, operative bi-fuel control assembly including the operative components thereof. The bi-fuel control system of the present invention includes three major sub-system comprising the gas control sub-system, the diesel control sub-system and the electronic monitoring and control sub-system. FIG. 1 relates to the gas control sub-system and more particularly to a gas sub-assembly and the operative components thereof which serve to implement the system. A supply of gas indicated as 10 is provided at a convenient and conventional location, wherein natural gas flows along a gas flow path generally indicated as 12 at a predetermined positive pressure of preferably from 1 psi and 5 psi. A preferably manual shut-off valve 14 is connected in fluid communication to the gas supply 10 and downstream thereof. The shut-off valve 14, which may be manual or controlled by a servo motor, is designed for safety purposes as a positive control device allowing all gas flow along the gas flow path 12 to be stopped in case of an emergency such, as but not limited to gas leaks, fire, etc.

A gas pressure sensor 16 is located along the gas flow path 12 downstream of the shut-off valve 14. The gas pressure sensor 16 is designed and structured to identify the inbound gas pressure, directing the system to automatically switch to the full diesel fuel mode of operation of the generator by shutting off the inbound gas flow in the event that the gas pressure along the gas fuel path 12 drops below the aforementioned pre-determined positive pressure of between 1 psi and 5 psi. The gas pressure sensor 16 is further structured to have a specified, pre-determine set point and is electrically activated and powered. Furthermore, once gas pressure has been restored to the aforementioned pre-determined pressure level, the pressure sensor 16 directs the system to switch from the full diesel fuel mode of operation automatically to the gas diesel fuel mode, such as by actuation of the shut-off valve 14 or preferably by actuation of another valve located in direct association therewith as will be described.

Specifically, an electrically operated solenoid valve 18 is located downstream of the pressure sensor 16 and is designed and structured to automatically stop gas flow along the gas flow path 12 to the driving engine 30 of the generator in the event of either a manual or automatic shut down of the overall bi-fuel control system, such as due to the detection of certain conditions including a gas pressure decrease, or in the case of a shut down of the generator unit as a whole. The gas solenoid valve 18 is disposed and structured to ensure that positive pressure gas flow is stopped prior to reaching the gas pressure regulator 20 also disposed along the gas flow path 12, and may indeed be associated with the pressure sensor 16.

As indicated, the system includes a gas fuel pressure regulator 20, which preferably is a zero governor, demand type regulator structured to reduce the inlet gas pressure from its inlet pressure to approximately atmospheric pressure. Therefore, a vacuum is required at the outlet side 20' of the gas pressure regulator 20 in order to draw the gas and maintain gas flow down stream along the gas flow path 12 from the gas pressure regulator 20 to the driving engine 30 of the generator. As such, the gas pressure regulator 20 is specifically designed to utilize a "demand" gas control scheme, whereby an engine vacuum which results in the intake air flow is utilized to determine gas flow requirements of the generator. In particular, as the generator load increases, there is a corresponding increase in the driving engine intake air volume and vacuum. This vacuum increase is communicated to the gas pressure regulator 20 by proportionally drawing gas in accordance with the strength of the vacuum generated by the driving engine. More specifically, light load demand will result in low vacuum and accordingly low gas flow being drawn, while to the contrary, high load demand will result in high vacuum and a high gas flow being drawn. This vacuum draw is preferably generated at an air fuel mixing device 26, to be described in greater detail subsequently, that is positioned further down stream and utilizes the venturi principal to generate a vacuum as air rushes therethrough into the driving engine as part of the normal operation of the driving engine.

Located downstream of the gas pressure regulator 20 is a gas control valve 22, which in a preferred embodiment of the present invention, is in the form of a butterfly type valve. The butterfly type valve defines one of the adjustable components of bi-fuel control system and is preferably set during the tuning phase of the generator conversion. Therefore, the gas control valve 22 is preferably an electrically operated butterfly valve which can be positioned in either a fully opened and accordingly de-energized position or a partially opened, fuel regulating position. The partially opened position of the gas control valve 22 is adjustable to allow the bi-fuel control system to have a separate gas flow adjustment for light to medium generator load levels and makes the bi-fuel control of the present invention more flexible for installation on generators which operate over a wide spectrum of load levels. The gas control valve 22 is scheduled or preset by monitoring the amperage output level of the generator as determined by an inductive sensor and relay control module associated with the electronic control and monitoring sub-system and sub-assembly as depicted in FIG. 3. As the generator load demand increases to the medium to high range, the gas control valve 22 is commanded to open fully to its de-energized position and no longer restricts gas flow to the engine along the fuel flow path 12. Of course, while the present preferred embodiment provides only for an energized and de-energized positioning of the gas control valve, it is further contemplated that increased adjustability could also be effectively achieved and beneficial in some circumstances, for example, a small servo motor or like control device may be integrated so as to provide for variable positioning of the gas control valve 22 in order to more precisely match or correspond desired flow levels. This setting can be processor or logic controlled dependant upon a variety of factors such as engine output load conditions or can be flow dependant.

The gas control sub-system and sub-assembly of FIG. 1 further includes a gas power valve 24 located along the gas flow path 12 preferably downstream of the gas control valve 22. The gas power valve 24 is preferably a needle type valve which is another of the pre-adjustable components of the bi-fuel control system. The needle type valve is set during the tuning phase of the generator conversion and is specifically structured to determine the maximum flow rate of gas to be permitted to the driving engine 30 of the generator. Once the maximum flow rate for the gas has been set, the needle type structure of the gas power valve 24 remains in a fixed position regardless of generator load demand. The gas power valve 24 serves as the primary adjustment for setting gas flow levels at the medium to high generator load level. It is also specifically disposed and structured to serve as a safety device by restricting gas flow to a pre-determined maximum flow rate over which excessive gas may cause potentially harmful operating conditions. Once the gas power valve 24 has been preset, the power output of the generator, when operating in the gas-diesel fuel mode, is limited by this adjustment.

As mentioned, the gas control sub-system and sub-assembly as schematically represented in FIG. 1 further includes an air fuel mixing device 26, also preferably located downstream of the gas power valve 24. The mixing device 26 is preferably of a fixed venturi design and is installed up stream of the air intake 28 of the driving engine 30 of the generator. In addition, the air fuel mixing device 26 is specifically structured and disposed relative to the main air intake 32, such that all incoming air is funneled through the air fuel mixing device 26. It should be noted that in the case of driving engines with multiple air intake systems, such as in turbo v-configured engines, separate or individual air fuel mixing devices are used for each of the separate air intakes. It is also important to note that the bi-fuel control system and assembly of the present invention has been specifically designed to utilized air fuel mixing devices which do not incorporate an air throttle plate or do not have any type of throttling function, thereby not hindering normal operation of the engine. Specifically, by utilizing a "demand" gas pressure regulator 20 and air fuel mixing device 26 in the form of a fixed venturi design that creates the demand, the subject bi-fuel control system ensures that the basic operating efficiency of the driving engine of the generator will not be negatively impacted by the use or installation of the system and assembly of the present invention, especially when operating in the normal full diesel fuel mode.

It is noted that conventional diesel engines do not utilize an air throttle device and thereby avoid "pumping loses" which result in significant efficiency penalties. Similarly the bi-fuel control system and assembly of the present invention does not utilize a throttle plate or include a throttling function. The bi-fuel system and assembly of the present invention thereby maintains an efficiency level during operation of the generator in the gas-diesel fuel mode comparable to the efficiency level when operating in the full diesel fuel mode. After exiting the air fuel mixing device 26, the air-gas homogeneous mixture is then ingested into the engine air take manifold schematically represented as 28 in a conventional fashion, where it is then distributed to each of the intake valves as per the normal intake air distribution scheme of the driving engine 30. As each intake valve opens, as per the valve timing scheme of the driving engine, the air-gas mixture is delivered to the cylinder to result in the achievement of required combustion in combination with a decreased quantity of diesel fuel being needed.

With reference to FIG. 2, an important feature of the present invention is the provision of a diesel fuel control sub-system and sub-assembly. The diesel fuel control sub-system is designed for controlling the amount of diesel fuel supplied to the driving engine 30 while the generator is operating in the gas-diesel fuel mode. A diesel fuel control valve 34 (DFCV) defines a primary component of the diesel fuel control system of FIG. 2 and is installed in the fuel system schematically and generally indicated as 36 of the driving engine 30. The diesel fuel control valve 34 is preferably electrically operated and is designed to have a three way valve structure incorporating an internal needle valve assembly (not shown for purpose of clarity). The diesel fuel control valve 34 can be manually or automatically adjusted such that when in the energized state, (i.e. when the system is in the bi-fuel mode) the flow of diesel fuel therethrough is significantly restricted thereby effectively decreasing the quantity of diesel fuel supplied to the engine 30 and allowing for the substitution therefore of the combustion of the homogeneous air-gas mixture which is a contributing ingredient in the gas-diesel fuel mode. For generators with duty cycles that include wide variations in load levels, and alternate diesel fuel control valve device may be used 34'. This alternate structure employs a secondary internal needle valve assembly which allows for fine adjustment of diesel fuel flow both for light to medium generator load demands and for medium to heavy load demands. In the case of the alternate construction of the diesel fuel control valve 34', it is scheduled by means of the main control panel 50 (See FIG. 3) by facilities associated with the electronic control and monitoring sub-assembly which are designed and structured to monitor generator amperage output levels of the generator as one means of determining generator load.

Installation of the diesel fuel control valve 34, 34' is dependent on the fuel delivery system design of the original generator unit. Typically, two types of fuel delivery systems are employed; (1) a rail type system which supplies fuel to rocker-arm activated diesel injectors by means of a fuel galley under relative low pressure, and (2) a positive displacement system which activates each injector with high pressure diesel fuel from a distributor type pump 42. The transfer type pump 42' is disposed along the diesel flow path 40 down stream of a diesel fuel supply as at 38. Filters or the like 44 may be incorporated along the flow path 40 up stream of the diesel fuel control valve 34 for obvious reasons. When in a de-energized state, the diesel fuel control valve 36 is specifically structured to automatically restore full diesel fuel flow capacity to the driving engine 30 by diverting the fuel flow path around the internal needle valve structure associated therewith. This allows the generator to operate in the aforementioned full diesel fuel mode. In addition, and as also depicted in FIG. 2, the diesel fuel control valve 34 is associated with a return valve as at 46 located up stream of the diesel fuel control valve 34 for purposes of relieving fuel back pressure which results on the inlet side of the diesel fuel control valve 34 as a result of the needle valve restriction of pressurized diesel fuel flow. As fuel pressure increases along the diesel fuel path 40 to a pre-determined level, such as but not limited to 60 psi, a relief valve 46, which may be in the form of a one way check valve having a preset cracking pressure of 60 psi, allows diesel fuel to flow along an auxiliary return line 47 back to the diesel fuel supply 38. Potentially harmful fuel back pressure is thereby relieved without requiring adjustment or modification to the original diesel fuel delivery scheme. Moreover, it is recognized that this valve structure could be integrally incorporated with the diesel fuel control valve 34 or could be a separate element disposed in line therewith. Also, although possible with either design, an integral design would be more suited to provide for facilitated adjustability of the relief pressure to correspond the diesel fuel back-pressure levels specified by the engine manufacturer. Indeed, the preferred embodiment of the present diesel fuel control valve 34 includes a pressure gauge and/or pressure gauge port so as to permit facilitated monitoring of the back pressure in order to provide for more precise fine tuning and setting of the pressure relief valve.

With reference to FIG. 3, another important feature of the present invention is the inclusion of the electronic control and monitoring sub-system and sub-assembly which is designed and structured to control the various components of the bi-fuel control system. This sub-system is also designed to monitor and indicate critical operating parameters of the driving engine, including the display of system data, and the detection and display of malfunctions, thereby providing an accurate status of the operation of the system and generator unit as a whole to an operator, and automatically preventing potentially harmful operating conditions.

The electronic control and monitoring sub-system and sub-assembly is preferably powered by a 12 or 24 volt DC power source 52. Input current flows to the electronic control and monitoring sub-system and sub-assembly through an oil pressure switch 54 and through a gas pressure switch 56 which are associated with appropriate monitoring facilities (not shown). If the contacts of either the oil pressure switch 54 or the gas pressure switch 56 are in the open position there is an indication of either a critical loss of engine oil pressure to the driving engine (or the driving engine has not yet started) or a lack of proper gas pressure, as set forth above with reference to the gas control sub-system and sub-assembly of FIG. 1. With regard to either of these conditions, operation in bi-fuel mode is not desired and the system will only permit operation of the generator in a conventional fashion under full diesel fuel mode. Of course, it is understood that the generators own safety systems may result in a further shut down if the low oil pressure and/or other operating parameters are not within tolerable levels for normal operation of the driving engine under the full diesel fuel mode. Furthermore, in the case of low gas pressure, the monitored indication will be displayed on an operator panel 50 by means of appropriate LED or other equivalent display structure. The operator panel 50 may also include additional displays such as an hour meter 58 for clearly disclosing and tracking the length of operation of the number of hours of operation in the gas-diesel fuel mode. Also an hour meter 60 indicates the length of operation in the full diesel fuel mode of operation.

The electronic control and monitoring sub-system and sub-assembly also preferably includes a temperature sensor and/or monitoring device as at 62 for determining the status of engine exhaust temperature. An engine exhaust temperature display (EGT) 63 may be mounted on the operator panel 50 and is connected to the temperature sensing device 62. It should be noted, that in the case of engines with dual exhaust systems such as in V-configured engines, each exhaust system as at 65 and 66 are independently monitored by separate temperature sensors 62 and 64 respectively. The respective temperatures are displayed on the (EGT) display assembly 63 located on operator panel 50 by digital or equivalent display means. In the event the exhaust gas temperature for either of the exhaust systems 65 or 66 exceeds a pre-determined adjustable set point, the electronic control and monitoring sub-system is specifically structured and designed to activate the associated components of the gas control sub-system and the diesel control sub-system for the shut-down of the bi-fuel control system and the return of the operation of the generator 100% diesel operation. In such an event the user or operator is notified by means of an appropriate LED or like digital display mounted on the operator panel 50. In addition, and as an important safe guard to the operation of the present invention, the bi-fuel control system will not restart full operation until a manually activated exhaust gas temperature reset switch 68 has been manually reset. Specifically, conventional diesel generators are structured to operate at a peak output exhaust temperature. Accordingly, the present system utilizes an increase in exhaust temperature above the peak exhaust temperature, or another desired maximum exhaust temperature set by a user, as a clear indicator of less than ideal operating conditions which make a return to full diesel fuel mode warranted. Of course, other monitoring systems may be equivalently implemented to ensure proper operating parameters.

In this regard, the electronic control and monitoring subsystem and sub-assembly also preferably includes two current monitor relays 74 and 76 which receive current input from a current transformer 72 that monitors generator amperage output levels. The first current relay (CMU) 74 has two adjustable set points as well as a time delay set point and serves as the activating device for the gas control valve 22 associated with the gas control sub-system and also as the activating device for the secondary or alternate diesel fuel control valve 34' if the latter is needed. The first set point of the first current monitored relay 74 is the load current (cut-off) set point below which the bi-fuel control system will de-activate the gas-diesel fuel mode of operation and initiate the full diesel fuel mode of operation of the generator. A low current status will be displayed by means of adequate digital and/or LED display on the operator panel 50 and is indicated as 74'. The second set point of the first current monitor relay 74 defines the light to medium load set point below which the gas control valve 22 and the secondary diesel fuel control valve 34' (if used) are activated as explained above. The first current monitor relay 74 also includes an adjustable time delay relay function which allows the electronic control and monitoring sub-system to ignore short term duration generator load deviations, thus preventing unnecessary cycling between light to medium gas diesel fuel settings and medium to heavy load gas diesel fuel settings.

The second current monitor relay (CMO) is indicated as 76 and is used to safe-guard the bi-fuel control against overloading of the generator beyond intended service limits or alternately in the case of generator de-rating due to poor fuel quality characteristics, engine durability concerns, etc.

In the event that the generator load exceeds the current limit set point of the second current monitor relay 76, the operation of the generator will switch from the gas-diesel fuel mode and return the generator to the full diesel fuel mode of operation. In addition, the second current monitor relay 76 includes an adjustable time delay relay function which allows the electronic control and monitoring system to ignore short duration generator load deviations, thus preventing unnecessary on/off cycling of the bi-fuel control system. A digital or equivalent display 76' is provided for operator viewing on panel 50.

It is noted that although the preferred embodiment of the present invention is configured to sense the engine output loads by monitoring the output amperage levels, other load output monitoring structures are also contemplated. For example, monitoring could also be achieved by monitoring/sensing the kilowatt output of the generator. Also, the manifold air pressure r "boost" pressure of the drive engine could be monitored as a load output indicator.

A further feature of the bi-fuel control system incorporates a master "on-delay" time relay 80 which is used for generator paralleling operations. In the event the modified generator is required to parallel with either one or more generators or with an electric utility grid, the bi-fuel control system will delay initiating operation in the gas-diesel fuel mode until such time as the generator has completed the paralleling operation, while operating in the full diesel fuel mode. This "delay" function is adjustable and gives the operator a predetermined range of time, preferably 1–300 seconds to complete the paralleling operation before the gas-diesel fuel mode operation of the generator is automatically initiated. As a result, pre-programmed paralleling operations associated with the diesel generator will not be affected or restricted by the implementation and/or operation of the present system.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A system for modifying diesel powered electric generators so as to be operated either in a full diesel fuel mode or a gas-diesel fuel mode, at substantially equivalent operating efficiencies, said system comprising:
   a) a gas control sub-system designed to control the amount of gas supplied to a driving engine of the generator while being operated in the gas-diesel fuel mode,
   b) a diesel control sub-system designed to control the amount of diesel fuel supplied to the driving engine while being operated in the gas-diesel fuel mode,
   c) an electronic control sub-system designed to regulate operation of pre-determined components of the gas control sub-system and the diesel control sub-system, and
   d) the gas control sub-system, the diesel control sub-system and the electronic control sub-system being collectively interdependent so as to allow a change of operation of the generator between the full diesel fuel mode and the gas-diesel fuel mode without generator power output being interrupted; and
   e) the gas control sub-system structured to permit the amount of gas supplied to the driving engine to be determined in response to the load requirements of the driving engine, and at least said gas control sub-system operating independently from a governor of the diesel engine; and
   f) said electronic control sub-system further structured to determine load levels through the monitoring of the driving engine's manifold air pressure.

2. A system as in claim 1 wherein the change of operation of the generator between the gas-diesel fuel mode and the full diesel fuel mode is accomplished either automatically or manually.

3. An assembly as recited in claim 2 wherein the gas control sub-system includes a manually regulatable flow of gas from a gas supply under a predetermined positive gas supply pressure.

4. A system as recited in claim 3 wherein the predetermined gas supply pressure is generally between 1 psi and 5 psi.

5. A system as recited in claim 4 wherein the gas control sub-system is further designed to regulate gas pressure by reducing the predetermined gas supply pressure to atmospheric pressure so as to allow continued gas flow to the driving engine substantially only on a demand basis.

6. A system as recited in claim 5 wherein a gas flow requirement to the driving engine is dependent on a driving engine vacuum created by a driving engine intake air flow.

7. A system as recited in claim 6 wherein the gas control sub-system is further designed to regulate gas flow and to have separate gas flow rates for light to medium generator load levels and for medium to heavy generator load levels.

8. A system as recited in claim 7 wherein the separate gas flow rates are adjustable and preset for operation over a wide spectrum of load levels.

9. A system as recited in claim 3 wherein the gas control sub-system is designed to monitor the predetermined gas supply pressure and automatically switch from the gas-diesel fuel mode to the full diesel fuel mode if the predetermined gas supply pressure drops below a specified set point.

10. A system as recited in claim 9 wherein the gas control sub-system is further designed to automatically switch back from the full diesel fuel mode to the gas-diesel fuel mode when the predetermined gas pressure rises above the specified set point.

11. A system as recited in claim 2 wherein the gas control sub-system is further designed to stop gas flow to the driving engine during the gas-diesel fuel mode in the event of a shut down of the system or a shut down of the generator.

12. A system as recited in claim 11 wherein the gas control sub-system is further designed to stop gas flow to the driving engine during the gas-diesel fuel mode during either automatic or manual shut down of the system.

13. A system as recited in claim 12 wherein the gas control sub-system is structured to stop gas flow to the driving engine at a location in the gas control sub-system which will ensure gas flow does not reach the driving engine during a period of operation in the full diesel fuel mode.

14. A system as recited in claim 2 wherein the gas control sub-system is structured to pre-set a maximum gas flow rate to the driving engine independent of load requirements of the generator.

15. A system as recited in claim 2 wherein the gas control sub-system is further structured to mix engine intake air and gas upstream of the driving engine air intake system on a demand basis without incorporating an air throttling function.

16. A system as recited in claim 2 wherein said gas control sub-system is structured to be scaleable.

17. A system as recited in claim 2 wherein the diesel control sub-system is further structured to selectively restrict the flow of diesel fuel supply to the driving engine and allow for a substitution of an air gas mixture during the gas-diesel fuel mode of operation.

18. A system as recited in claim 17 wherein the diesel control sub-system is structured to permit manual adjustment of the flow of diesel fuel.

19. A system as recited in claim 17 wherein the diesel control sub-system further includes a secondary adjustment of the flow of diesel fuel dependent on load requirements of the generator being light to medium or medium to heavy.

20. A system as recited in claim 19 wherein the electronic control sub-system determines the secondary adjustment by determining the load levels through the monitoring of generator amperage output levels.

21. A system as recited in claim 19 wherein the electronic control sub-system determines the secondary adjustment by determining the load levels through the monitoring of generator kilowatt output.

22. A system as recited in claim 19 wherein the diesel control sub-system is structured to automatically restore 100% intended diesel fuel flow to the driving engine when the generator is in the full diesel fuel mode.

23. A system as recited in claim 22 wherein the diesel control sub-system will relieve back pressure in a diesel fuel flow path by diverting diesel fuel flow back to a diesel fuel supply upon fuel back pressure reaching a predetermined level.

24. A system as recited in claim 2 wherein said diesel control sub-system is structured to be scaleable.

25. A system as recited in claim 2 wherein the electronic control sub-system is further designed to monitor and display predetermined operating parameters of the gas control system, the diesel control system and the driving engine.

26. A system as recited in claim 25 wherein the electronic control system is further designed to cease operation in the gas diesel fuel mode upon a monitored indication of low oil pressure of the driving engine.

27. A system as recited in claim 26 wherein the electronic control system is further designed to cease operation in the gas diesel fuel mode upon a monitor indication of low gas pressure.

28. A system as recited in claim 25 wherein the electronic control sub-system is further designed to automatically cease operation in the gas-diesel fuel mode and begin operation in the full diesel fuel mode upon an exhaust gas temperature of the driving engine exceeding a predetermined temperature range.

29. A system as recited in claim 28 wherein the predetermined temperature range of the exhaust gas temperature comprises a manually adjustable set point.

30. A system as recited in claim 28 wherein the exhaust gas temperature in a generator having a dual exhaust system is determined by independently monitoring the exhaust gas temperature of each exhaust of the dual exhaust system.

31. A system as recited in claim 28 wherein the electronic control sub-system structured to permit a resumption to operation in the gas-diesel fuel mode, subsequent to automatically ceased operation due to said exhaust gas temperature of the driving engine exceeding said predetermined temperature range, only upon manual re-activation subsequent to a monitored display of the exhaust gas temperature within the predetermined temperature range.

32. A system as recited in claim 28 wherein the electronic control sub-system is further designed to initially monitor electric current input and to regulate both gas flow and diesel fuel flow dependent on electric current input relative to a first adjustable set point and a second adjustable set point.

33. A system as recited in claim 32 wherein the first adjustable set point comprises a low current cut-off set point below which operation will automatically cease in the gas-diesel fuel mode and begin in the full diesel fuel mode.

34. A system as recited in claim 32 wherein the second adjustable set point comprises a light to medium load set point below which operation of the gas-diesel fuel mode will continue.

35. A system as recited in claim 34 wherein the electronic control sub-system is further designed to secondarily monitor received electric current input for safe guarding against overloading of the generator beyond intended service limits by automatically ceasing operation in the gas-diesel fuel mode and beginning operation in the full diesel fuel mode.

36. A system as recited in claim 35 wherein the electronic control sub-system is further designed to include an adjustable time delay function allowing short duration generator load deviation to be ignored and thereby preventing resulting on-off cycling between operation in the gas-diesel fuel mode and full diesel fuel mode.

37. A system as recited in claim 2 further comprising a master time delay designed to delay initiation of operation in the gas-diesel fuel mode for an adjustable, pre-set time period to accommodate paralleling operations with one or more additional generators or an electric utility grid.

38. A system as in claim 1 wherein the operation of the generator in the gas-diesel fuel mode is at least partially defined by operation of the generator at a predetermined mixture of methane based gas and diesel fuel.

39. A system as recited in claim 38 wherein the quantity gas utilized in the gas-diesel fuel mode of operation of the generator is generally between 40% to 90% of the total fuel consumed by the driving engine during operation in the gas-diesel fuel mode.

40. An assembly designed to modify a diesel powered electric generator so as to be operable in either a gas-diesel fuel mode or a full diesel fuel mode at comparable operating efficiencies, said assembly comprising:

a) a gas control sub-assembly structured to control the amount of gas supplied to a driving engine of the generator during operation in the gas-diesel fuel mode, b) a diesel control sub-assembly structured to control the amount of diesel fuel supplied to the driving engine while being operated in the gas-diesel fuel mode, c) an electronic control sub-assembly structured to at least partially regulate operation of said gas control sub-assembly and said diesel control sub-assembly, and d) said gas control sub-assembly, said diesel control sub-assembly and said electronic control sub-assembly being cooperatively structured to provide both automatic and manual changes of operation of the generator between the gas-diesel fuel mode and the full diesel fuel mode without disruption of generator power output, e) said gas control sub-assembly further including a gas pressure regulator, and f) said gas pressure regulator structured to utilize a demand control for gas flow, said demand control defined by the vacuum generated by an intake air flow of the driving engine.

41. An assembly as recited in claim 40 structured to operate on a predetermined mixture of methane based gas fuel and diesel fuel during operation of the generator in the gas-diesel fuel mode.

42. An assembly as recited in claim 41 wherein said predetermined mixture of methane based gas fuel comprises substantially 40% to 90% of the total fuel consumed during operation in the gas-diesel fuel mode.

43. An assembly as recited in claim 42 wherein said gas control sub-assembly comprises a main shut-off valve disposed to regulate gas flow under positive pressure from a gas supply.

44. An assembly as recited in claim 43 wherein said gas control sub-assembly further comprises a gas pressure sensor disposed down stream of said main shut-off valve and structured to switch operation from the gas-diesel fuel mode to the full diesel fuel mode when gas pressure drops below a predetermined pressure and automatically switch operation back to the gas-diesel fuel mode upon restoration of the gas pressure to at least said predetermined pressure.

45. An assembly as recited in claim 44 wherein said gas control sub-assembly further comprises a solenoid valve disposed down stream of said gas pressure sensor and structured to automatically stop gas flow to the driving engine upon shut down of the assembly or the generator.

46. An assembly as recited in claim 45 wherein said solenoid valve is disposed and structured to ensure stoppage of positive pressure gas flow into the driving engine.

47. An assembly as recited in claim 45 wherein said gas control sub-assembly further comprises said gas pressure regulator disposed down stream of said solenoid valve and structured to reduce positive gas pressure so as to require a vacuum to be present at an outlet of said gas pressure regulator in order to generate gas flow to the driving engine.

48. An assembly as recited in claim 47 wherein said gas control sub-assembly further comprises a gas control valve located down stream of said gas pressure regulator and structured to control gas flow dependent on the generator load demand being light to medium or medium to heavy.

49. An assembly as recited in claim 48 wherein said gas control valve comprises a butterfly valve structured to assume a substantially fully opened, de-energized position during medium to heavy load demands and a partially opened positioned during light to medium load demands.

50. An assembly as recited in claim 48 wherein said gas control valve is adjustably positionable into a plurality of orientations.

51. An assembly as recited in claim 48 wherein said gas control sub-assembly further comprises a gas power valve located down stream of said gas control valve and structured to determine a maximum rate of gas flow to the driving engine during operation in the gas-diesel fuel mode.

52. An assembly as recited in claim 51 wherein said gas power valve comprises an adjustable needle valve structured to be pre-set in a fixed position to determine the maximum rate of gas flow independent of generator load demands.

53. An assembly as recited in claim 51 wherein said gas control sub-assembly further comprises an air-fuel mixing device located in fluid communication with the gas flow, down stream of said gas power valve and up stream of an air intake of the driving engine, said air-fuel mixing device further disposed and structured to funnel all incoming air therethrough prior to reaching the air intake system of the driving engine.

54. An assembly as recited in claim 53 wherein said air-fuel mixing device comprises a fixed venturi further disposed and structured to deliver an air-gas homogeneous mixture to the engine air intake manifold absent any throttling function.

55. An assembly as recited in claim 41 wherein said diesel control sub-assembly comprises a diesel fuel control valve disposed within the generator fuel system and structured to significantly restrict flow of diesel fuel to the driving engine during operation in the gas-diesel fuel mode, said diesel fuel control valve being further structured to restore normal diesel fuel flow during operation in the full diesel fuel mode.

56. An assembly as recited in claim 55 wherein said diesel fuel control valve comprises at least one manually adjustable, internal needle valve.

57. An assembly as recited in claim 56 wherein said diesel fuel control valve further comprises a secondary internal needle valve structured to provide fine adjustment of the flow of diesel fuel during both light to medium load demands and medium to heavy load demands of the generator.

58. An assembly as recited in claim 55 wherein said diesel control sub-assembly is structured to relieve fuel back pressure on an inlet side of said diesel fuel control valve by diverting flow of diesel fuel from said diesel fuel control valve to a diesel fuel supply upon fuel back pressure resulting from a restricted flow at said diesel fuel control valve reaching a predetermined point.

59. An assembly as recited in claim 41 wherein said electronic control sub-assembly is further structured to monitor predetermined engine parameters and display system data to a user.

60. An assembly as recited in claim 59 wherein said electronic control sub-assembly further comprises an oil pressure switch structured to automatically assume an opened position upon a detection of a predetermined low oil pressure and thereby cease operation in the gas-diesel fuel mode.

61. An assembly as recited in claim 60 wherein said electronic control sub-assembly further comprises a gas pressure switch structured to automatically assume an opened position upon a detection of a predetermined low gas pressure and thereby cease operation in the gas-diesel fuel mode.

62. An assembly as recited in claim 61 wherein said electronic control sub-assembly further comprises an engine exhaust gas temperature monitor assembly structured to automatically cease operation in the gas-diesel fuel mode and begin operation in the full diesel fuel mode upon the engine exhaust gas temperature exceeding a predetermined temperature.

63. An assembly as recited in claim 62 wherein said electronic control sub-assembly comprises a manual exhaust gas temperature reset switch structured to transfer operation from the full diesel fuel mode to the gas-diesel fuel mode upon a monitored indication of the engine exhaust gas temperature assuming a predetermined acceptable level.

64. An assembly as recited in claim 63 wherein said electronic control sub-assembly further comprises a first current relay assembly and a second current relay assembly; said first current relay assembly structured to include adjustable first and second set points and further structured to regulate gas and diesel flow during operation in the gas-diesel fuel mode.

65. An assembly as recited in claim 64 wherein said first set point defines a low current cut off set point below which operation will switch from the gas-diesel fuel mode to the full diesel fuel mode.

66. An assembly as recited in claim 64 wherein said second set point defines a light to medium load demand set point for activating gas flow and said diesel fuel flow when operating in the gas-diesel fuel mode.

67. An assembly as recited in claim 66 wherein said second current relay assembly is structure to switch operation from the gas-diesel fuel mode to the full diesel fuel mode when generator load demands exceed predetermined pre-set limits.

68. An assembly as recited in claim 67 wherein said first relay assembly further comprises an adjustable time delay set point structured to ignore short duration generator load deviations and prevent cycling between light to medium load fuel settings and medium to heavy load fuel settings during operation in the gas-diesel fuel mode.

69. An assembly as in claim 67 wherein said second relay assembly further comprises an adjustable time delay set point structured to ignore short duration generator load deviations and prevent associated on-off cycling between operation in the gas-diesel fuel mode and the full diesel fuel mode.

70. An assembly as recited in claim 41 further comprising a master time relay structured to automatically delay initiation of operation in the gas diesel fuel mode for a predetermined time period until the generator while operating in a full diesel fuel mode has completed paralleling functions.

71. A system for modifying diesel powered electric generators so as to be operated either in a full diesel fuel mode or a gas-diesel fuel mode, at substantially equivalent operating efficiencies, said system comprising:
   a) a gas control sub-system designed to control the amount of gas supplied to a driving engine of the generator while being operated in the gas-diesel fuel mode,
   b) a diesel control sub-system designed to control the amount of diesel fuel supplied to the driving engine while being operated in the gas-diesel fuel mode,
   c) an electronic control sub-system designed to regulate operation of pre-determined components of the gas control sub-system and the diesel control sub-system, and
   d) the gas control sub-system, the diesel control sub-system and the electronic control sub-system being collectively interdependent so as to allow a change of operation of the generator between the full diesel fuel mode and the gas-diesel fuel mode without generator power output being interrupted;
   e) the gas control sub-system structured to permit the amount of gas supplied to the driving engine to be determined in response to the load requirements of the driving engine, ad at least said gas control sub-system operating independently from a governor of the diesel engine; and
   f) the electronic control system is further structured to cease operation in the gas diesel fuel mode upon a monitored indication of low oil pressure of the driving engine.

72. A system for modifying diesel powered electric generators so as to be operated either in a full diesel fuel mode or a gas-diesel fuel mode, at substantially equivalent operating efficiencies, said system comprising:
   a) a gas control sub-system designed to control the amount of gas supplied to a driving engine of the generator while being operated in the gas-diesel fuel mode,
   b) a diesel control sub-system designed to control the amount of diesel fuel supplied to the driving engine while being operated in the gas-diesel fuel mode,
   c) an electronic control sub-system designed to regulate operation of pre-determined components of the gas control sub-system and the diesel control sub-system, and
   d) the gas control sub-system, the diesel control sub-system and the electronic control sub-system being collectively interdependent so as to allow a change of operation of the generator between the full diesel fuel mode and the gas-diesel fuel mode without generator power output being interrupted;
   e) the gas control sub-system structured to permit the amount of gas supplied to the driving engine to be determined in response to the load requirements of the driving engine, ad at least said gas control sub-system operating independently from a governor of the diesel engine; and
   f) the electronic control sub-system is further structured to automatically cease operation in the gas-diesel fuel mode and begin operation in the full diesel fuel mode upon an exhaust gas temperature of the driving engine exceeding a predetermined temperature range, the exhaust gas temperature in a generator having a dual exhaust system is determined by independently monitoring the exhaust gas temperature of each exhaust of the dual exhaust system.

73. A system for modifying diesel powered electric generators so as to be operated either in a full diesel fuel mode or a gas-diesel fuel mode, at substantially equivalent operating efficiencies, said system comprising:
   a) a gas control sub-system designed to control the amount of gas supplied to a driving engine of the generator while being operated in the gas-diesel fuel mode,
   b) a diesel control sub-system designed to control the amount of diesel fuel supplied to the driving engine while being operated in the gas-diesel fuel mode,
   c) an electronic control sub-system designed to regulate operation of pre-determined components of the gas control sub-system and the diesel control sub-system, and
   d) the gas control sub-system, the diesel control sub-system and the electronic control sub-system being collectively interdependent so as to allow a change of operation of the generator between the full diesel fuel mode and the gas-diesel fuel mode without generator power output being interrupted;
   e) the gas control sub-system structured to permit the amount of gas supplied to the driving engine to be determined in response to the load requirements of the driving engine, ad at least said gas control sub-system operating independently from a governor of the diesel engine; and
   f) the electronic control sub-system is further structured to include an adjustable time delay function allowing short duration generator load deviation to be ignored and thereby preventing resulting on-off cycling between operation in the gas-diesel fuel mode and full diesel fuel mode.

74. A system for modifying diesel powered electric generators so as to be operated either in a full diesel fuel mode or a gas-diesel fuel mode, at substantially equivalent operating efficiencies, said system comprising:
   a) a gas control sub-system designed to control the amount of gas supplied to a driving engine of the generator while being operated in the gas-diesel fuel mode,
   b) a diesel control sub-system designed to control the amount of diesel fuel supplied to the driving engine while being operated in the gas-diesel fuel mode, c) an electronic control sub-system designed to regulate operation of pre-determined components of the gas control sub-system and the diesel control sub-system, and d) the gas control sub-system, the diesel control sub-system and the electronic control sub-system being collectively interdependent so as to allow a change of operation of the generator between the full diesel fuel mode and the gas-diesel fuel mode without generator power output being interrupted;

e) the gas control sub-system structured to permit the amount of gas supplied to the driving engine to be determined in response to the load requirements of the driving engine, ad at least said gas control sub-system operating independently from a governor of the diesel engine; and f) a master time delay structured to delay initiation of operation in the gas-diesel fuel mode for an adjustable, pre-set time period to accommodate paralleling operations with one or more additional generators or an electric utility grid.

75. An assembly designed to modify a diesel powered electric generator so as to be operable in either a gas-diesel fuel mode or a full diesel fuel mode at comparable operating efficiencies, said assembly comprising:

a) a gas control sub-assembly structured to control the amount of gas supplied to a driving engine of the generator during operation in the gas-diesel fuel mode, b) a diesel control sub-assembly structured to control the amount of diesel fuel supplied to the driving engine while being operated in the gas-diesel fuel mode, c) an electronic control sub-assembly structured to at least partially regulate operation of said gas control sub-assembly and said diesel control sub-assembly, d) said gas control sub-assembly, said diesel control sub-assembly and said electronic control sub-assembly being cooperatively structured to provide both automatic and manual changes of operation of the generator between the gas-diesel fuel mode and the full diesel fuel mode without disruption of generator power output, e) said diesel control sub-assembly further including a diesel fuel control valve, and f) said diesel fuel control valve including at least one manually adjustable, internal needle valve.

76. An assembly designed to modify a diesel powered electric generator so as to be operable in either a gas-diesel fuel mode or a full diesel fuel mode at comparable operating efficiencies, said assembly comprising:

a) a gas control sub-assembly structured to control the amount of gas supplied to a driving engine of the generator during operation in the gas-diesel fuel mode, b) a diesel control sub-assembly structured to control the amount of diesel fuel supplied to the driving engine while being operated in the gas-diesel fuel mode, c) an electronic control sub-assembly structured to at least partially regulate operation of said gas control sub-assembly and said diesel control sub-assembly, d) said gas control sub-assembly, said diesel control sub-assembly and said electronic control sub-assembly being cooperatively structured to provide both automatic and manual changes of operation of the generator between the gas-diesel fuel mode and the full diesel fuel mode without disruption of generator power output, e) said diesel control sub-assembly further including a diesel fuel control valve, and f) said diesel control sub-assembly further structured to relieve fuel back pressure on an inlet side of said diesel fuel control valve by diverting flow of diesel fuel from said diesel fuel control valve to a diesel fuel supply upon fuel back pressure resulting from a restricted flow at said diesel fuel control valve reaching a predetermined point.

77. An assembly designed to modify a diesel powered electric generator so as to be operable in either a gas-diesel fuel mode or a full diesel fuel mode at comparable operating efficiencies, said assembly comprising:

a) a gas control sub-assembly structured to control the amount of gas supplied to a driving engine of the generator during operation in the gas-diesel fuel mode, b) a diesel control sub-assembly structured to control the amount of diesel fuel supplied to the driving engine while being operated in the gas-diesel fuel mode, c) an electronic control sub-assembly structured to at least partially regulate operation of said gas control sub-assembly and said diesel control sub-assembly, d) said gas control sub-assembly, said diesel control sub-assembly and said electronic control sub-assembly being cooperatively structured to provide both automatic and manual changes of operation of the generator between the gas-diesel fuel mode and the full diesel fuel mode without disruption of generator power output, and f) said electronic control sub-assembly further including an oil pressure switch structured to automatically assume an opened position upon a detection of a predetermined low oil pressure and thereby cease operation in the gas-diesel fuel mode.

* * * * *